United States Patent [19]

Fujioka et al.

[11] 4,279,961

[45] Jul. 21, 1981

[54] ELECTROSTATIC RECORD MATERIAL

[75] Inventors: Hironari Fujioka; Hajime Matsubayashi, both of Amagasaki, Japan

[73] Assignee: Kanzaki Paper Manufacturing Co., Ltd., Japan

[21] Appl. No.: 140,710

[22] Filed: Apr. 16, 1980

[30] Foreign Application Priority Data

Apr. 20, 1979 [JP] Japan .................................. 54-49275

[51] Int. Cl.³ ........................ B32B 5/16; G01D 15/06
[52] U.S. Cl. ................................ 428/328; 346/135.1; 346/150; 427/121; 428/206; 428/207; 428/329; 428/537; 430/87; 430/88; 430/90
[58] Field of Search ............................ 346/135.1, 150; 427/121, 126; 428/206, 207, 328, 329, 537, 539, 913, 914; 430/87, 88, 90

[56] References Cited

U.S. PATENT DOCUMENTS

| | | | |
|---|---|---|---|
| 3,515,686 | 6/1970 | Bowman et al. | 252/518 |
| 3,691,105 | 9/1972 | Juna et al. | 252/518 |
| 3,708,290 | 1/1973 | Verhille et al. | 430/89 |
| 4,173,677 | 11/1979 | Nakano et al. | 428/336 |

FOREIGN PATENT DOCUMENTS 51-25140  3/1976  Japan ...................................... 428/328

*Primary Examiner*—Bruce H. Hess
*Attorney, Agent, or Firm*—Armstrong, Nikaido, Marmelstein & Kubovcik

[57] ABSTRACT

An electrostatic record material comprising an electroconductive base sheet and a record layer formed on the base sheet and predominantly containing an insulating resin, the record material being characterized in that the electroconductive base sheet has an electroconductive layer comprising:

(i) a zinc oxide powder having a specific resistivity of 0.01 to 900 ohm-cm at pressure of 150 kg/cm²;
(ii) a coloring agent having a spectral reflectance of 400 to 530 nm; and
(iii) another coloring agent having a spectral reflectance of 580 to 800 nm.

2 Claims, No Drawings

ELECTROSTATIC RECORD MATERIAL

This invention relates to an electrostatic record material, and more particularly to an electrostatic record material comprising an electroconductive base sheet and a record layer formed on the base sheet and consisting essentially of insulating resin.

Electrostatic recording processes use a record material comprising an electroconductive base sheet and a record layer formed on the base sheet and composed mainly of insulating resin. With these processes, voltage pulses are applied directly to the record layer of the material or electrostatic latent images formed on a plate are transferred onto the record layer to form electrostatic latent images on the record layer, and the latent images are converted to visible images with a toner. Electrostatic recording processes are widely used for facsimile systems, copying machines and other printers.

While facsimile systems were operated at a low speed of 5 to 6 min/A-4-size sheet, such low-speed machines have been replaced by medium-speed machines (2-3 min/A-4-size sheet) or high-speed machines (1 min/A-4-size sheet or higher) with an increase in the amount of information to be handled. Accordingly the voltage pulse widthh used has changed from 500 $\mu$.sec or longer to 50-100 $\mu$.sec or to 20 $\mu$.sec or shorter. To obtain satisfactory records with stability in accordance with the various changes attendant on the speed-up of the facsimile systems, the electrostatic record material must have reduced impedance. Most suitably the electroconductive base sheet of the electrostatic record material usually has a surface electrical resistivity of $10^6$ to $10^{10}$ ohms. Especially for use in high-speed facsimile systems, the record material must meet a very strict resistivity requirement. For example, a reduced image density will result at a surface electrical resistivity of $10^{11}$ ohms, and little or no record will be reproduced at $10^{12}$ ohms. Accordingly the electroconductive base sheet of record material for use in usual facsimile processes is adapted to have a resistivity of $10^6$ to $10^{10}$ ohms at usual humidity, but the conductive base sheet has a higher resistivity in an atmosphere of lower humidity because the treating agent usually used for rendering the base sheet electroconductive is an electroconductive resin the degree of ionization of which reduces with a decrease in the moisture content of the base sheet to give a lower conductivity, namely a higher resistivity.

To remedy the foregoing drawbacks, it has been proposed to maintain the moisture content of the base sheet at low humidities by using polyethylene glycol, polypropylene glycol, glycerin or the like water-retaining agents, lithium chloride, sodium chloride; calcium chloride or the like salts; zeolite, montmorillonite, silica gel or the like water-retaining materials; and so forth in admixture with high-molecular-weight materials. However, this fails to give the base sheet sufficient electroconductivity, hence unfavorable.

Further, with the same intent, an electrostatic record material was developed which is free of the drawback resulting from the use of such an electroconductive resin (Published Unexamined Japanese patent application No.25140/1976). In place of the conventional electroconductive resin, a zinc oxide powder having a specific resistivity of $1\times 10^3$ to $9\times 10^5$ ohm-cm is used for this material. The material, however, still has the following drawbacks. When the zinc oxide powder having such a specific resistivity is used with a water-soluble or water-dispersible adhesive such as polyvinyl alcohol, methyl cellulose, styrene-butadiene copolymer or the like, the resulting material will have reduced conductivity, consequently giving a record of low density. For this reason, the adhesives usable with the powder are limited to those of the organic solvent type incorporating methyl methacrylate, ethyl methacrylate, styrene, melamine, cellulose acetate, vinyl acetate or like polymer, acrylic monomer-styrene copolymer, vinyl chloride-vinyl acetate copolymer, or like resin which is soluble in organic solvents. The use of the organic solvent nevertheless entails various drawbacks such as inconvenience of handling, hazard of fire and expensiveness.

We conducted intensive research to overcome the prior art deficiencies stated above, particularly those involved in the use of the latter electrostatic record material and discovered the following fact. When using a zinc oxide powder having a specified specific resistivity of 0.01 to 500 ohm-cm in place of the conventional zinc oxide, the base sheet, even if containing a water-soluble or water-dispersible resin adhesive, does not have such reduced specific resistivity as given by known zinc oxide. Thus the use of the above specified zinc oxide can eliminate the need to use any organic solvent and the disadvantage attributable to the use of an organic solvent. The invention on this concept was applied for a patent in the U.S.A. under U.S. Pat. application Ser. No. 53424. In the course of continued research, we have found that it is possible to produce electrostatic record materials with excellent properties over the range of the low to high humidities by using a zinc oxide powder having a specified specific resistivity of 0.01 to 500 ohm-cm, in admixture with a cationic high-molecular-weight electrolyte. A patent application on this concept was also filed in the U.S. under Ser. No.58941.

The two prior inventions stated above, although remarkably valuable themselves, suffer from some minor defects hereinafter mentioned. Since the electroconductive zinc oxide with a specific resistivity of 0.01 to 500 ohm-cm has light greenish color, resulting electrostatic record material also has light color, consequently failing to provide a sharp contrast between the recorded image area and the other area or to give a record image with high density. This problem should be solved if it is necessary to produce electrostatic record materials with most favorable properties.

In view of the above, we have continued research to obtain electrostatic record materials of improved properties and found in the course of the research that when incorporated titanium dioxide, calcium carbonate or the like white pigments into the electroconductive zinc oxide to remove as much as possible the light color from the base sheet which has been afforded by use of the zinc oxide, a large amount of white pigment need be used, which nevertheless gives lower electroconductivity to the base sheet.

An object of this invention is to provide an electrostatic record material prepared by using the electroconductive zinc oxide as specified above and removing the light color of the zinc oxide from the base sheet without any decrease in the electroconductivity of the zinc oxide.

Another object of this invention is to provide an electrostatic record material having natural whiteness and prepared by the use of the above specified electroconductive zinc oxide.

Another object is to provide an electrostatic record material prepared by the use of the foregoing zinc oxide and capable of providing a considerable contrast between the recorded image area and the other area of the record material which contrast is comparable to that obtained without use of the zinc oxide.

The above-mentioned objects and the other advantages of this invention will become apparent from the following description.

This invention provides an electrostatic record material comprising an electroconductive base sheet and a record layer formed on the base sheet and predominantly containing an insulating resin, the record material being characterized in that the electroconductive base sheet has an electroconductive layer comprising (i) a zinc oxide powder having a specific resistivity of 0.01 to 900 ohm-cm at pressure of 150 kg/cm$^2$, (ii) a coloring agent having a spectral reflectance of 400 to 530 nm and (iii) another coloring agent having a spectral reflectance of 580 to 800 nm.

The zinc oxide powder to be used in this invention has a specified specific resistivity of 0.01 to 900 ohm-cm at pressure of 150 kg/cm$^2$. The specific zinc oxide powder is prepared by admixing with zinc oxide a small amount of at least one of $Al_2O_3$, $Cr_2O_3$, $Ga_2O_3$, $In_2O_3$ and a compound which produces such an oxide when heated at a high temperature, and heating the mixture at a high temperature preferably in a reducing atmosphere. Examples of useful compounds which produce $Al_2O_3$ are aluminum chloride, aluminum sulfate, aluminum nitrate, etc., compounds producing $Cr_2O_3$ include chromium chloride, chromium sulfate, etc., those producing $Ga_2O_3$ include gallium chloride, gallium sulfate, gallium nitrate, etc., and those producing $In_2O_3$ include indium chloride, indium sulfate, indium nitrate, etc. The specific resistivity of the zinc oxide powder obtained is adjustable by suitably determining the kind and amount of the additive used, heating temperature, heating time, cooling conditions, etc. The amount of the additive to be used, although not particularly limited, is usually about 0.1 to about 5 mole %, preferably about 0.5 to about 2 mole %. The mixture is heated usually at 800° to 1100° C. for 2 to 5 hours. After heating, the product is cooled slowly preferably at a rate of 5° to 10° C./min. The cooled product is pulverized as desired. The zinc oxide powder thus prepared for use in this invention is usually 0.5 to 3μ, preferably about 0.8 to about 2μ, in particle size as determined by the Blain permeability method.

The zinc oxide powder useful in this invention must have a specific resistivity of 0.01 to 900 ohm-cm, preferably 0.1 to 500 ohm-cm, most preferably 1 to 400 ohm-cm, at pressure of 150 kg/cm$^2$. Zinc oxide powders lower than 0.01ohm-cm in specific resistivity are very difficult to prepare. Production of such powder, if attempted, requires use of an increased amount of an additive which produces $Al_2O_3$ or like oxide and necessitates a higher heating temperature. Consequently the zinc oxide powder obtained has a slightly blackish color and includes a greatly increased amount of agglomerates of particles due to sintering. Such powder is extremely difficult to formulate into a coating composition and seriously impairs the quality of the record material produced. Conversely zinc oxide powders higher than 900 ohm-cm in specific resistivity, when used conjointly with a water-soluble or water-dispersible adhesive, exhibit an increased surface resistivity, substantially failing to give the desired record density even at the ambient humidity.

The specific resistivity of the zinc oxide powder in this invention is measured by the following method. The zinc oxide powder (240 to 260 mg) is allowed to stand in an atmosphere at 20° C. and 60% RH for 2 hours and is thereafter placed into a container of polytetrafluoroethylene having a specimen packing tube 4.1 mm in diameter. The powder is pressed with brass cylinder, 4 mm in diameter, from opposite ends of the tube at four different pressure values in the range of 100 to 200 kg/cm$^2$. The specific resistivity of the powder is measured at each of the pressure values. The resistivity values obtained are plotted to determine the specific resistivity at 150 kg/cm$^2$ from the curve.

With this invention, it is necessary to conjointly use at least two kinds of coloring agents each having a specific spectral reflectance. Useful coloring agents of one kind are those having a spectral reflectance of 400 to 530 nm, preferably 430 to 500 nm, and those of the other kind have a spectral reflectance of 580 to 800 nm, preferably 600 to 700 nm. Examples of the former kind are CI Vat Blues 4, 6 and 20, CI Pigment Blues 2, 3, 15, 16, 17 and 45 or like organic pigments, ultramarine, cobalt blue, cerulean blue or like inorganic pigments, CI Acid Blues 22, 25, 43, 45 and 59 or like organic dyes, and so forth. Useful coloring agents of the latter kind include CI Pigment Reds 2, 3, 4, 5, 6, 7, 8, 9, 10, 11, 12, 14, 15, 16, 17, 18, 19, 21, 22, 23, 30, 31, 32, 37, 39, 39, 41, 97 and 114 or like organic pigments, molybdenum red, red iron oxide, cadmium red or like inorganic pigments, CI Acid Reds 13, 18, 26, 32 and 42 or the like organic dyes, and so forth. Among the coloring agents exemplified above, the organic pigments are most preferable because they are more effective in providing an improved contrast between the recorded image area and the other area of the record material than the inorganic pigments and are outstanding in providing record materials with a higher resistance to light than the organic dyes which are likely to yield record materials colored by light.

The proportions of the coloring agents relative to the electroconductive zinc oxide are appropriately controlled depending on the kind of the zinc oxide used. Preferably the proportions of the coloring agents are suitably adjusted such that when determining the hue of the electroconductive layer in terms of chroma and lightness by the L, a, b method using COLOR and COLOR DIFFERENCE METER, ND-K-5 model (trade name, product of Nihondenshoku Kogyo Co., Ltd., Japan) [see Yukio MURATA, "Industrial Colorimetrics" (Sen-i Company), page 251], the values of a and b are between more than $-2.5$ and less than 2.5, more preferably between more than $-1.8$ and less than 1.8. Generally it is desirable to control the amounts of the coloring agents to those in the range of 0.0001 to 0.03 part by weight per 100 parts by weight of the zinc oxide.

With this invention, the zinc oxide powder is preferably admixed with a water-soluble or water-dispersible adhesive resin. Since the use of the above adhesive resin does not reduce the electroconductivity of electrostatic record materials, this obviates the necessity of using an organic solvent and therefore the disadvantage attendant on the use of organic solvent. Examples of water-soluble or water-dispersible adhesive resins useful in this invention are a wide variety of adhesive resins including polyvinyl alcohol, methyl cellulose, hydroxyethyl cellulose, starch, modified starch, polyvinyl pyrolidone, polyacrylamide, styrene-butadiene copolymer latex, vinyl acetate-type latex, acrylic acid-type latex, salts of styrene-maleic anhydride copolymer, salts of isobutene-maleic anhydride copolymer, salts of styrene-acrylic copolymer, salts of styrene-methacrylic acid copolymer, salts of styrene-sulfonic acid copolymer, salts of vinyl acetate-crotonic acid copolymer, salts of ethylene-acrylic acid copolymer, salts of acrylamide-acrylic acid copolymer, salts of poly alginic acid, salts of styrene-butylacrylatemethacrylic acid copolymer, etc.

High-molecular-weight electrolytes are also usable in this invention. With this invention, it is preferable to use cationic electrolytes as such electrolytes. The use of cationic electrolytes gives electrostatic record materials having excellent properties over the range of low to high humidities. Examples of cationic electrolytes useful in this invention are those having an ammonium salt, sulfonium salt or phosphonium salt as a functional group. Exemplary of these resins are polyethyleneimine hydrochloride, poly(N-methyl-4-vinylpyridinium-chloride, poly(2-methacryloyloxyethyltrimethylammoniumchloride), poly(2-hydroxy-3-methacryloyloxypropyltrimethylammoniumchloride), poly(N-acrylamidopropyl-3-trimethylammoniumchloride), poly(N,N-dimethyl-3,5-methylenepiperidiniumchloride), polyvinyltrimethylammoniumchloride, polyallyltrimethylammoniumchloride, polydiallyldimethyl ammoniumchloride, polyvinylbenzyltrimethyl ammoniumchloride and like ammonium salts, poly(2-acryloxyethyl-dimethylsulfoniumchloride) and like sulfonium salts, poly(glycidyltributylphosphoniumchloride) and like phosphonium salts. Among these cationic resins, ammonium salts, especially quaternary ammonium salts are most preferable to use.

The coating composition prepared can be applied to the base sheet by coating means such as a bar coater, air knife coater, or blade coater, or by pregnation as with a size press. The former coating means is more preferable than the latter method. The coating composition is applied thereto in such an amount that the sheet will have a surface resistivity of $10^6$ to $10^{10}$ ohms at the ambient humidity. The amount is usually 2 to 20 g/m$^2$, preferably about 5 to about 15 g/m$^2$ by dry weight.

Another electroconductive layer is conventionally formed on the other surface of the base sheet opposite to the record layer bearing surface thereof when so required. Such a conductive layer can be similarly formed in this invention if so desired. The additional conductive layer need not always be the same as the specific conductive layer of this invention underlying the record layer but can be a conductive layer composed of a usual electroconductive resin.

According to this invention, the record layer can be formed from any of various coating compositions usually used for preparation of electrostatic record material of this kind and including those of the organic solvent type and aqueous solution or dispersion type. The resins useful for preparing such coating compositions include polymers or copolymers of vinyl monomers such as vinyl chloride, vinyl acetate, vinyl acetal, vinylidene chloride, ethylene, styrene, butadiene, acrylate, methacrylate, acrylonitrile, acrylic acid, methacrylic acid, etc., silicone resin, polyester resin, polyurethane resin, alkyd resin, epoxy resin and the like insulating resin. These resins are used singly or in admixture as dissolved in an organic solvent or dispersed in water. The coating composition may further incorporate additives usually used in the art, such as inorganic pigments, finely divided polymer particles, starch powder and dyes. More specifically stated, the useful additives include calcium carbonate, barium sulfate, zinc sulfide, titanium dioxide, clay, kaolin, aluminum oxide, aluminum hydroxide or the like inorganic pigments; polystyrene microball, polyamide powder or the like finely divided polymer particles; and fluorescent dye or the like dyes.

For a better understanding of this invention, examples and comparison examples are given below, but the invention is in no way limited thereto. All the parts and percentages are by weight unless otherwise specified.

EXAMPLE 1

To zinc oxide (product of HAKUSUI KAGAKU CO., LTD., Japan) is added 0.5 mole % of aqueous solution of Al(NO$_3$)$_3$.9H$_2$O for use as Al$_2$O$_3$ component, and these ingredients are fully mixed together. The mixture is dried at a temperature of 100° C. and then pulverized. The resulting powder is heated in a muffle furnace at 900° C. for 90 minutes to prepare an electroconductive zinc oxide powder having a specific resistivity of 11 ohm-cm at pressure of 150 kg/cm$^2$.

The resulting zinc oxide powder (100 parts) is mixed with 90 parts of a 7% aqueous solution of methyl cellulose (trade mark: "MCSM-15," product of SHIN-ETSU KAGAKU CO., LTD., Japan) and 100 parts of water, and the mixture is dispersed in a ball mill for 1 hour. To the dispersion thus prepared are added 50 parts of 0.02% aqueous dispersion of an organic pigment having a spectral reflectance of 400 to 530 nm (product of DAINICHISEIKA CO., LTD., Japan, TB-Color TB-2023 Navy Blue) and 50 parts of 0.02% aqueous dispersion of another organic pigment having a spectral reflectance of 580 to 800 nm (product of DAINICHISEIKA CO., LTD., Japan, TB-Color TB-2026 Red), and the admixture is fully stirred to prepare an electroconductive coating composition.

An electroconductive base sheet is prepared by applying the coating composition to one side of web of wood-free paper weighing 49 g/m$^2$ with use of coating rods in an amount of 10 g/m$^2$ by dry weight.

The electroconductive base sheet obtained above is checked for the hue by the L, a, b method. The results are $a = -0.8$ and $b = 0.7$. The base sheet is then allowed to stand at 20° C. and 50% RH for 24 hours. The surface resistivity of the electroconductive layer is measured by an insulating resistance measuring device (product of KAWAGUCHI DENKI CO., LTD., VE-30 model). The measurement is $3.2 \times 10^7$ ohms.

EXAMPLES 2 TO 5 AND REFERENCE EXAMPLES 1 TO 3

Seven kinds of electroconductive base sheets are prepared in the same manner as in Example 1 except that 0.02% aqueous dispersions of TB-2023 Navy Blue and TB-2026 Red respectively are used in the proportions listed in Table 1. The base sheets thus prepared are checked for the hue and surface resistivity in the same manner as in Example 1. Table 1 shows the results.

TABLE 1

|  | TB-2023 Navy-Blue (part) | TB-2026 Red (part) | Hue | | Resistivity of base sheet ($\times 10^7$ ohm) |
| --- | --- | --- | --- | --- | --- |
|  |  |  | a | b |  |
| Example 1 | 50 | 50 | −0.8 | 0.7 | 3.2 |
| Example 2 | 100 | 100 | 0.2 | −0.2 | 3.5 |
| Example 3 | 75 | 50 | −0.1 | 1.0 | 3.5 |

TABLE 1-continued

| | TB-2023 Navy-Blue (part) | TB-2026 Red (part) | Hue a | Hue b | Resistivity of base sheet ($\times 10^7$ ohm) |
|---|---|---|---|---|---|
| Example 4 | 20 | 15 | −1.0 | 0 | 3.9 |
| Example 5 | 2 | 2 | −1.6 | 1.0 | 4.1 |
| Reference Example 1 | 0 | 0 | −4.0 | 2.0 | 3.1 |
| Reference Example 2 | 0.5 | 0.5 | −3.5 | 1.5 | 2.9 |
| Reference Example 3 | 250 | 250 | 5.0 | −3.0 | 3.8 |

EXAMPLES 6 TO 9

Four kinds of electroconductive base sheets are prepared in the same manner as in Example 1 except that 0.02% aqueous dispersions of the organic pigments as shown in Table 2 are used in place of 0.02% aqueous dispersions of TB-2023 Navy Blue and TB-2026 Red. The resulting base sheets are checked for the hue and surface resistivity in the same manner as in Example 1. Table 2 shows the results.

TABLE 2

| Example | Organic pigment (400–530 nm) | Organic pigment (580–800 nm) | Hue a | Hue b | Resistivity of base sheet ($\times 10^7$ ohms) |
|---|---|---|---|---|---|
| 6 | CI Pigment Blue-15*[1] | CI Pigment Red-3*[2] | −1.0 | 0.9 | 3.7 |
| 7 | CI Pigment Blue-15*[1] | CI Pigment Red-5*[3] | −1.1 | 0.9 | 4.9 |
| 8 | CI Pigment Blue-15*[4] | CI Pigment Red-10*[5] | −0.9 | 1.2 | 3.8 |
| 9 | CI Pigment Blue-15*[4] | CI Pigment Red-22*[6] | −1.2 | 1.2 | 4.0 |

*[1] product of DAINICHISEIKA CO., LTD., Japan, Dainichi Cyanine Blue B (trade name)
*[2] product of DAINICHISEIKA CO., LTD., Japan, Dainichi Permanent Red-4R (trade name)
*[3] product of SUMITOMO CHEMICAL CO., LTD., Japan, Lake Carmine B (trade name)
*[4] product of DAINICHISEIKA CO., LTD., Japan, Chromofine NSG (trade name)
*[5] product of ICI CO., LTD., the U.K., Monolite Fast Red-FR (trade name)
*[6] product of KIWA KAGAKU CO., LTD., Japan, Kiwa Fast Brilliant Scarlet (trade name)

EXAMPLE 10

An electroconductive base sheet is prepared in the same manner as in Example 1 except that 30 parts of 0.02% aqueous dispersion of each of two organic dyes, i.e. CI Acid Blue 23 (product of SUMITOMO CHEMICAL CO., LTD., Suminol Leveling Blue 4GL) and CI Acid Red 85 (product of SUMITOMO CHEMICAL CO., LTD., Suminol Milling Red PG) are used in place of 50 parts of 0.02% of aqueous dispersions of each of TB-2023 Navy Blue and TB-2026 Red. The base sheet is checked in the same manner as in Example 1 for the hue and surface resistivity. The results are a=−1.5 and b=0.5 and $3.3\times 10^7$ ohms.

REFERENCE EXAMPLE 4

An electroconductive base sheet is prepared in the same manner as in Example 1 with the exception of using an electroconductive coating composition which is produced by mixing together 75 parts of the same kind of electroconductive zinc oxide as used in Example 1, 25 parts of titanium dioxide, 90 parts of 7% aqueous solution of methyl cellulose and 100 parts of water to disperse the mixture in a ball mill for 1 hour. The base sheet is checked in the same manner as in Example 1 for the hue and surface resistivity. The results are a=−1.5, b=0.5 and $5\times 10^{10}$ ohms.

Electrostatic record materials are prepared by the method stated hereinafter with the use of 14 kinds of the electroconductive coating compositions obtained above, and are checked for the recording characteristics.

One of the 14 kinds of coating compositions is applied by an air knife coater to both sides of web of wood-free paper weighing 49 g/m²; to one side in an amount of 10 g/m² by dry weight and to the other side in an amount of 5 g/m² by dry weight. The coated sheet is dried to prepare an electroconductive base sheet.

A 400 part quantity of 20% solution of methyl ethyl ketone of vinyl chloride-vinyl acetate (50:50) copolymer and 20 parts of calcium carbonate are mixed together and the mixture is fully stirred and dispersed by a mixer to prepare a record layer forming coating composition. The coating composition thus prepared is applied in an amount of 5 g/m² by dry weight by a bar-coater to the surface of the base sheet coated with the first-mentioned electroconductive coating composition in an amount of 10 g/m² by dry weight to prepare an electrostatic record material. Thirteen kinds of electrostatic record materials are prepared in the same manner as above with use of the other 13 kinds of the electroconductive coating compositions.

The record materials thus produced are tested for the recording characteristics by the following method. The sheets are recorded by a high-speed facsimile placed in an atmosphere having a temperature of 20° C. and 55% RH, under the conditions of a line density of 8 lines/mm, pulse width of 12 $\mu$.sec, pin voltage of −300 V and subvoltage of +300 V. The density of the images is measured by Macbeth densitometer (Model No. RD-100R, product of Macbeth Co., Ltd.) in terms of reflection density. The results are given in Table 3. The whiteness of the record materials is determined with the unaided eyes with the results also indicated in Table 3.

TABLE 3

| | Density of Image | Whiteness |
|---|---|---|
| Example 1 | 1.1–1.2 | Best |
| Example 2 | 1.1–1.2 | Good |
| Example 3 | 1.1–1.2 | Best |
| Example 4 | 1.1–1.2 | Best |
| Example 5 | 1.1–1.2 | Good |
| Example 6 | 1.1–1.2 | Best |
| Example 7 | 1.1–1.2 | Best |
| Example 8 | 1.1–1.2 | Best |
| Example 9 | 1.1–1.2 | Best |
| Example 10 | 1.1–1.2 | Best |
| Ref. Ex. 1 | 1.1–1.2 | Worst |
| Ref. Ex. 2 | 1.1–1.2 | Bad |
| Ref. Ex. 3 | 1.1–1.2 | Worst |
| Ref. Ex. 4 | 0.2–0.3 | Best |

Table 1 to 3 reveal that in the above Examples of this invention, the color of electroconductive zinc oxide is successfully removed from the base sheet without detriment to the electroconductivity of the base sheet by using specific coloring agents and that the record materials of this invention have appearance having whiteness and can give record images at a high density with a sharp contrast and a high stability even at low humidities.

EXAMPLES 11 TO 13

Three kinds of electroconductive base sheets are prepared in the same manner as in Example 1 except that the specific resins listed in Table 4 below are used in place of the methyl cellulose as used in Example 1. The hue and surface resistivity of the base sheets prepared above are measured in the same manner as in Example 1. Table 4 shows the results.

TABLE 4

| Resin | Hue a | Hue b | Surface resistivity (ohm) |
|---|---|---|---|
| Salt of Styrene-acrylic acid copolymer[*1] | −0.7 | 0.8 | $8.5 \times 10^7$ |
| Salt of styrene-maleic anhydride copolymer[*2] | −0.7 | 0.8 | $1.5 \times 10^8$ |
| Salt of styrene-butylacrylate -methacrylic acid copolymer[*3] | −0.7 | 0.8 | $9.5 \times 10^7$ |

[*1]product of ARAKAWA CHEMICAL CO., LTD., Japan, Polymaron-356 (trade name)
[*2]product of MONSANTO COMPANY, USA, Scripset-500 (trade name)
[*3]product of ARAKAWA CHEMICAL CO., LTD., Japan, KS-326 (trade name)

EXAMPLES 14 TO 18

Five kinds of electroconductive base sheets are prepared in the same manner as in Example 1 with the exception of using the specific zinc oxide powders shown in Table 5 below in place of the zinc oxide powder as used in Example 1.

TABLE 5

| No. | | Hue a | Hue b | Surface resistivity (ohm) |
|---|---|---|---|---|
| 1 | ZnO(Al) 90Ω | −0.6 | 0.7 | $1 \times 10^8$ |
| 2 | ZnO(Al) 200Ω | −0.6 | 0.7 | $4 \times 10^8$ |
| 3 | ZnO(Cr) 150Ω | −0.8 | 0.9 | $1 \times 10^8$ |
| 4 | ZnO(Ga) 450Ω | −0.8 | 0.9 | $5 \times 10^8$ |
| 5 | ZnO(In) 150Ω | −0.8 | 0.9 | $1 \times 10^8$ |

Five kinds of zinc oxide used in Examples 14 to 18 are prepared by the following method.

No. 1 [ZnO(Al)]:

To zinc oxide (product of Hakusui Kagaku Co., Ltd., Japan) is added 0.4 mole % of an aqueous solution of $Al(NO_3)_3.9H_2O$ and these ingredients are fully mixed together. The mixture is dried at 100° C. and then pulverized to particles of about $0.2\mu$ in size. The particles are heated in a muffle furnace at 900° C. for 60 minutes to prepare the electroconductive zinc oxide powder of No. 1 [ZnO(Al)] having the specific resistivity of 90 Ω-cm.

No. 2 [ZnO(Al)]:

The electroconductive zinc oxide of No. 2 [ZnO(Al)] is prepared in the same manner as in the preparation of above No. 1 zinc oxide except that 0.2 mole % of an aqueous solution of $Al(NO_3)_3.9H_2O$ is used in place of 0.4 mole % of the aqueous solution of $Al(NO_3)_3.9H_2O$. The electroconductive resistivity of the product is 200 Ω-cm.

No. 3 [ZnO(Cr)]:

To zinc oxide (product of Hakusui Kagaku Co., Ltd., Japan) is added 1.0 mole % of an aqueous solution of $CrCl_3.6H_2O$ and these ingredients are fully mixed together. The mixture is dried at 100° C. and then pulverized to particles of about $0.2\mu$ in size. The particles are heated in a muffle furnace at 1000° C. for 100 minutes to prepare No. 3 zinc oxide having the specific resistivity of 150 Ω-cm.

No. 4 [ZnO(Ga)]:

The No. 4 zinc oxide is prepared in the same manner as in the preparation of the above No. 3 zinc oxide except that 0.2 mole % of an aqueous solution of $Ga_2(SO_4)_3.18H_2O$ is used in place of 1.0 mole % of the aqueous solution of $CrCO_3.6H_2O$. The product has the specific resistivity of 450 Ω-cm.

No. 5 [ZnO(In)]:

To zinc oxide (product of Hakusui Kagaku Co., Ltd., Japan) is added 0.5 mole % of an aqueous solution of $InCl_3.6H_2O$ and these ingredients are fully mixed together. The mixture is dried at 100° C. and then pulverized to particles of about $0.2\mu$ in size. The particles are heated in a muffle furnace at 900° C. for 90 minutes to prepare No. 5 zinc oxide having the specific resistivity of 150 Ω-cm.

Record materials are prepared by the use of the eight kinds of electroconductive coating compositions obtained hereinbefore and the record materials are checked for the recording characteristics in the same manner as in Table 3. Table 6 shows the results.

TABLE 6

| | Density of Image | Whiteness |
|---|---|---|
| Example 11 | 1.1–1.2 | Best |
| Example 12 | 1.1–1.2 | Best |
| Example 13 | 1.1–1.2 | Best |
| Example 14 | 1.1–1.2 | Best |
| Example 15 | 0.7–0.8 | Best |
| Example 16 | 1.1–1.2 | Best |
| Example 17 | 1.1–1.2 | Best |
| Example 18 | 1.1–1.2 | Best |

We claim:

1. An electrostatic record material comprising a support substrate sheet, an electroconductive base layer on said support, and a record forming layer on said base layer, wherein the improvement comprises utilizing an electroconductive base layer comprising:
   (i) a zinc oxide powder containing relatively small amounts of at least one additive member selected from the group consisting of $Al_2O_3$, $Cr_2O_3$, $Ga_2O_3$ and $In_2O_3$, said powder having a specific resistivity of 0.01 to 900 ohm-cm at a pressure of 150 Kg/cm$^2$; and
   (ii) two coloring agents each in an amount of 0.0001 to 0.03 part by weight per 100 parts by weight of said zinc oxide powder, wherein one of said coloring agents has a spectral reflectance of 400 to 530 nm and the other of said coloring agents has a spectral reflectance of 580 to 800 nm.

2. An electrostatic record material as defined in claim 1 in which the two coloring agents are both organic pigments.

* * * * *